(12) United States Patent
Yoo et al.

(10) Patent No.: US 9,454,967 B2
(45) Date of Patent: Sep. 27, 2016

(54) APPARATUS AND METHOD FOR GENERATING WAVE FIELD SYNTHESIS SIGNALS

(71) Applicant: Electronics and Telecommunications Research Institute, Daejeon (KR)

(72) Inventors: Jae-Hyoun Yoo, Daejeon (KR); Keun Woo Choi, Seoul (KR); Jeong Il Seo, Daejeon (KR); Kyeong Ok Kang, Daejeon (KR)

(73) Assignee: Electronics and Telecommunications Research Instit, Daejeon (KR)

( * ) Notice: Subject to any disclaimer, the term of this patent is extended or adjusted under 35 U.S.C. 154(b) by 583 days.

(21) Appl. No.: 13/804,221

(22) Filed: Mar. 14, 2013

(65) Prior Publication Data

US 2013/0325476 A1 Dec. 5, 2013

(30) Foreign Application Priority Data

May 31, 2012 (KR) .................. 10-2012-0058557

(51) Int. Cl.
*G06F 17/00* (2006.01)
*G10L 17/00* (2013.01)
*H04S 7/00* (2006.01)

(52) U.S. Cl.
CPC .............. *G10L 17/005* (2013.01); *H04S 7/30* (2013.01); *H04S 2420/13* (2013.01)

(58) Field of Classification Search
CPC ...... H04S 2420/13; H04S 7/305; H04R 5/00
See application file for complete search history.

(56) References Cited

U.S. PATENT DOCUMENTS

2006/0109992 A1* 5/2006 Roeder et al. ................ 381/310
2009/0136048 A1* 5/2009 Yoo et al. ....................... 381/27

FOREIGN PATENT DOCUMENTS

KR 10-2009-0054802 A 6/2009
KR 10-2011-0065144 A 6/2011

OTHER PUBLICATIONS

Berkhout, Acoustic control by wave field synthesis, Nov. 13, 1991, Deft University of Technology, Laboratory of Seismic and Acoustics, The Netherlands, revised Sep. 21, 1992, pp. 2770-2777.*
A. J. Berkhout et al., Acoustic control by wave field synthesis, The Journal of the Acoustical Society of America, May 1993, pp. 2764-2778, vol. 93, No. 5.

* cited by examiner

*Primary Examiner* — Jesse Elbin
*Assistant Examiner* — Thomas Maung
(74) *Attorney, Agent, or Firm* — William Park & Associates Ltd.

(57) ABSTRACT

An apparatus and method for generating a wave field synthesis (WFS) signal in consideration of a height of a speaker are disclosed. The WFS signal generation apparatus may include a waveform propagation distance determination unit to determine a propagation distance of a waveform propagate from a sound source based on a height of a speaker, and a WFS signal generation unit to generate a WFS signal corresponding to the speaker using the propagation distance of the waveform.

10 Claims, 5 Drawing Sheets

APPARATUS AND METHOD FOR GENERATING WAVE FIELD SYNTHESIS SIGNALS

CROSS-REFERENCE TO RELATED APPLICATION

This application claims the benefit of Korean Patent Application No. 10-2012-0058557, filed on May 31, 2012, in the Korean Intellectual Property Office, the disclosure of which is incorporated herein by reference.

BACKGROUND

1. Field of the Invention

The present invention relates to an apparatus and method for generating a wave field synthesis (WFS) signal, and more particularly, to a WFS signal generation apparatus and method preventing a user from considering a wrong position as a set position of a sound source when a plurality of speakers are installed at different heights.

2. Description of the Related Art

A wave field synthesis (WFS) technology provides a same surround sound to a plurality of listeners in an auditory space by synthesizing wavefronts of sound sources to be reproduced.

Basically, the WFS technology presumes that a sound source, a speaker, and a user are installed on the same plane. That is, accordingly, the WFS technology presumes stationary phase approximation according to which speakers linearly connecting from the sound source to the user mostly contribute to implementation of a wave field.

However, in a state where the speakers are arranged only coplanarly in accordance with the above presumption, when a height of a seating position of the user is changed or when the sound source being reproduced moves up and down, the user may consider a wrong position as a set position of the sound source.

Therefore, a WFS system in which speakers are disposed at different heights is necessitated. However, when a WFS signal is generated in the WFS system including the speakers disposed at different heights according to a conventional WFS signal generation method based on the stationary phase approximation, reproduction of the wave field may not be normally performed depending on heights of the speakers.

Accordingly, there is a desire for a method for generating a WFS signal to efficiently reproduce a wave field in a WFS system in which speakers are disposed at different heights.

SUMMARY

An aspect of the present invention provides an apparatus and method preventing a user from considering a wrong position as a set position of the sound source in a state where a plurality of speakers are disposed at different heights.

According to an aspect of the present invention, there is provided a wave field synthesis (WFS) signal generation apparatus including a waveform propagation distance determination unit to determine a propagation distance of a waveform propagate from a sound source based on a height of a speaker, and a WFS signal generation unit to generate a WFS signal corresponding to the speaker using the propagation distance of the waveform.

The WFS signal generation apparatus may further include a speaker recognition unit to recognize a speaker disposed at a different height from a height of a user among speakers included in a wave field reproduction system.

The waveform propagation distance determination unit may determine a distance for the waveform propagate from the sound source based on a height of the recognized speaker to pass through the recognized speaker and move to the user.

According to another aspect of the present invention, there is provided a wave field synthesis (WFS) signal generation method including determining a propagation distance of a waveform propagate from a sound source based on a height of a speaker, and generating a WFS signal corresponding to the speaker using the propagation distance of the waveform.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
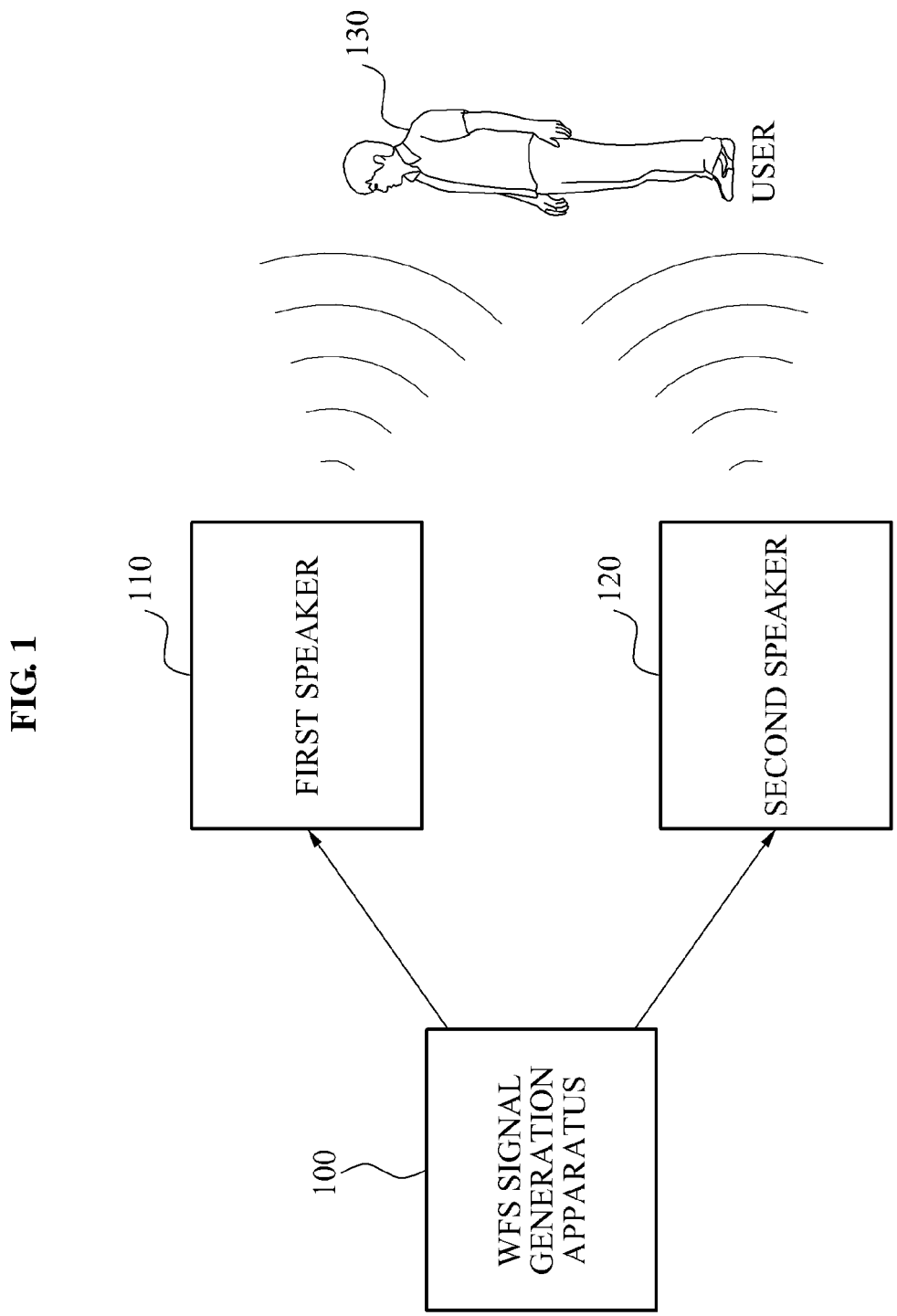
FIG. 1 is a diagram illustrating a wave field reproduction system including a wave field synthesis (WFS) signal generation apparatus according to an embodiment of the present invention.

Reference will now be made in detail to exemplary embodiments of the present invention, examples of which are illustrated in the accompanying drawings, wherein like reference numerals refer to the like elements throughout. A wave field synthesis (WFS) signal generation method according to an embodiment of the present invention may be performed by a WFS signal generation apparatus.

FIG. 1 is a diagram illustrating a wave field reproduction system including a WFS signal generation apparatus according to an embodiment of the present invention.

Referring to FIG. 1, the wave field reproduction system may include a WFS signal generation apparatus 100, a first speaker 110, and a second speaker 120.

The first speaker 110 and the second speaker 120 may reproduce a wave field for a user 130 by reproducing different WFS signals, respectively. The first speaker 110 and the second speaker 120 may be disposed at different heights from each other. In addition, the first speaker 110 and the second speaker 120 may be a loud speaker array.

The WFS signal generation apparatus 100 may generate WFS signals corresponding to the first speaker 110 and the second speaker 120 and transmit the WFS signals to the first speaker 110 and the second speaker 120.

When at least one of the first speaker 110 and the second speaker 120 is disposed at a different height from a height of the user 130, a waveform propagate from a set position of a sound source moves up or down depending on the heights of the first speaker 110 and the second speaker 120 and then moves to the user 130. Therefore, a propagation distance of the waveform may be longer than a distance between the position of the sound source and the position of the user 130.

That is, when the WFS signal is generated corresponding to the distance between the user 130 and the position set as the position of the sound source only with respect to a horizontal plane, the user may perceive the sound source to be located nearer than the set position of the sound source.

Therefore, the WFS signal generation apparatus 100 may determine the propagation distance of the waveform on a 3-dimensional (3D) space according to a height of a speaker and generate a WFS signal using the propagation distance of the waveform, so that the user perceives the sound source to be located at the set position of the sound source in a wave field reproduction system in which a plurality of speakers to reproduce a wave field for a user are disposed at different heights.

Figure 2:
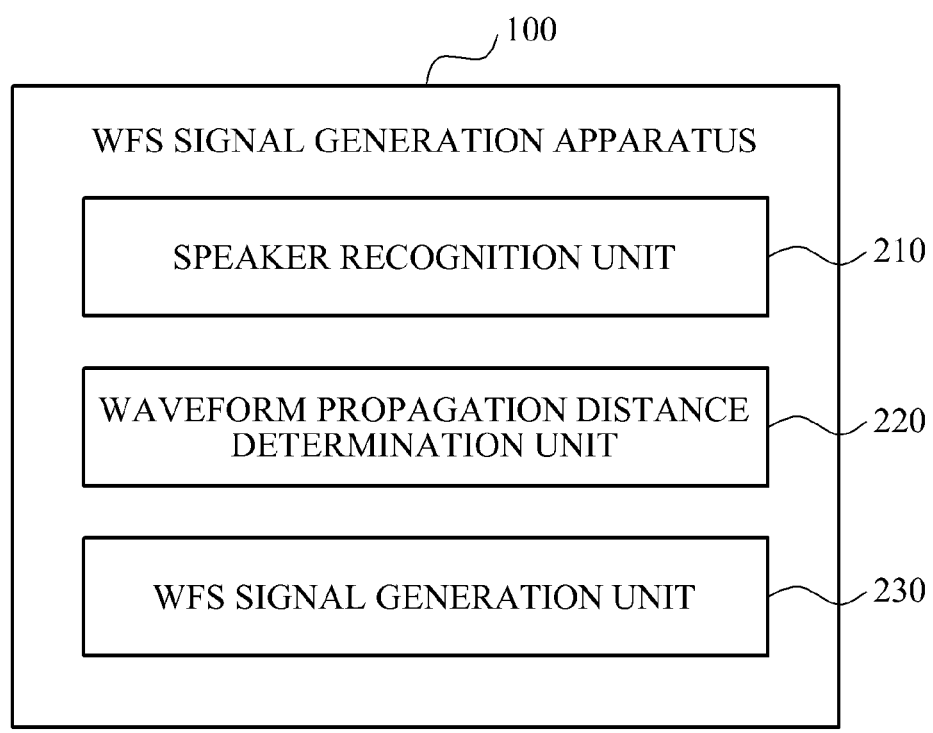
FIG. 2 is a block diagram illustrating a WFS signal generation apparatus according to an embodiment of the present invention.

FIG. 2 is a block diagram illustrating a WFS signal generation apparatus 100 according to an embodiment of the present invention.

Referring to FIG. 2, the WFS signal generation apparatus 100 may include a speaker recognition unit 210, a waveform propagation distance determination unit 220, and a WFS signal generation unit 230.

The speaker recognition unit 210 may recognize a speaker disposed at a different height from a height of a user among speakers included in the wave field reproduction system. Here, with reference to a whole body of the user, a speaker disposed on a ground and a speaker disposed at the same height as a head height of the user may be recognized to be at different heights. In addition, since the user perceives the wave field with reference to a position of his or her ear, the speaker recognition unit 210 may use an ear height of the user as the height of the user.

For example, in the wave field reproduction system in which speakers are disposed on the ground and on a ceiling, respectively, and the user seats on the ground, the speaker recognition unit 210 may recognize only the speaker disposed on the ceiling as the speaker disposed at the different height from the height of the user. Conversely, in the wave field reproduction system in which speakers are disposed on the ground and on the ceiling and the user seats on a sofa, the speaker recognition unit 210 may determine the speaker disposed on the ground to be at a lower height than the ear height of the user, thereby recognizing the speaker disposed on the ground and the speaker disposed on the ceiling both as the speaker disposed at the different height from the height of the user. That is, the speaker to be recognized may be varied according to a seating height of the user.

The waveform propagation distance determination unit 220 may determine the propagation distance of the waveform propagate from the sound source using the height of the speaker. In detail, the waveform propagation distance determination unit 220 may determine a distance for the waveform propagate from the sound source to pass through the speaker recognized by the speaker recognition unit 210 and move to the user, using a height of the speaker recognized by the speaker recognition unit 210.

The waveform propagation distance determination unit 220 may determine the propagation distance of the waveform, using a distance between the sound source and a speaker with respect to a horizontal plane, a distance between the speaker and the user with respect to a horizontal plane, and a height of the speaker. A process of determining the propagation distance will be described in detail with reference to FIG. 4.

The WFS signal generation unit 230 may generate a WFS signal corresponding to the speaker recognized by the speaker recognition unit 210, by rendering the sound source using the propagation distance of the waveform determined by the waveform propagation distance determination unit 220.

In detail, the WFS signal generation unit 230 may generate the WFS signal by rendering the sound source by setting the propagation distance of the waveform, which is determined by the waveform propagation distance determination unit 220, as the distance between the sound source and the user.

Among the speakers included in the wave field reproduction system, a speaker not recognized by the speaker recognition unit 210 is the speaker disposed at the same height as the ear height of the user. Therefore, in this case, the propagation distance of the waveform is equal to the distance between the sound source and the user with respect to the horizontal plane. Accordingly, the WFS signal generation unit 230 may generate the WFS signal corresponding to the speaker disposed at the same height as the ear height of the user among the speakers included in the wave field reproduction system, by setting a sum of the distance between the sound source and the speaker and the distance between the speaker and the user.

According to the embodiment of the present invention, since the propagation distance of the waveform is determined according to the height of the speaker and the WFS signal is generated based on the distance of the waveform, the user may be prevented from considering a wrong position as a set position of the sound source in a state where a plurality of speakers are disposed at different heights.

Figure 3:
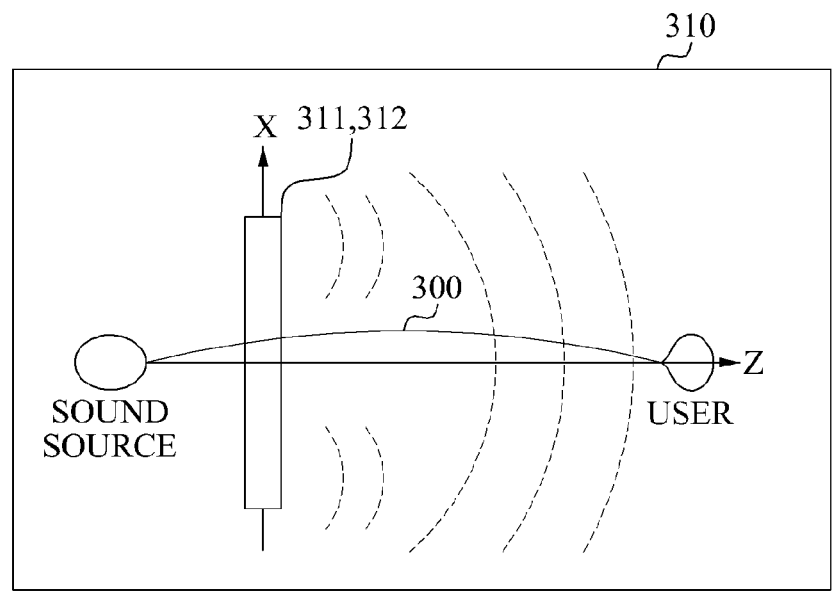
FIG. 3 is a diagram illustrating a double vertical array wave field reproduction system according to an embodiment of the present invention.
Figure 3:
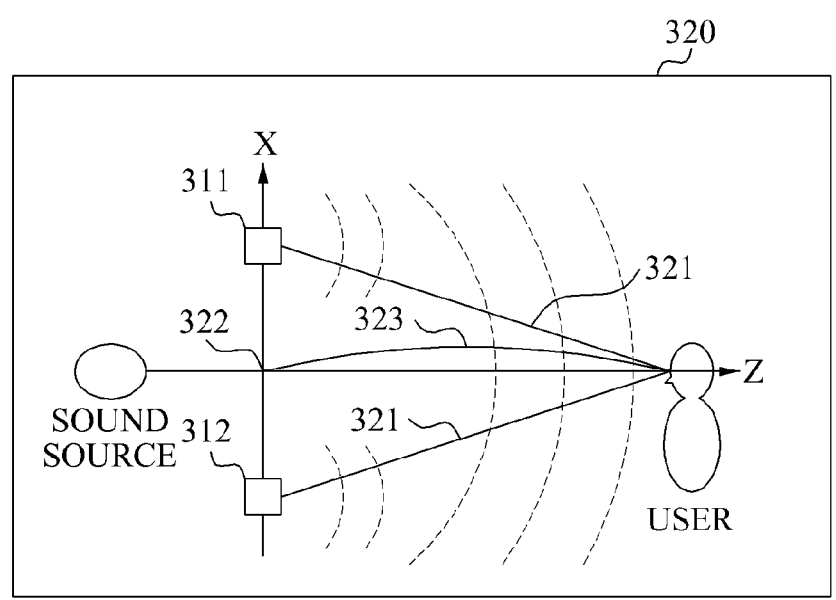

FIG. 3 is a diagram illustrating a double vertical array wave field reproduction system according to an embodiment of the present invention.

When seen from above as shown by a diagram 310 of FIG. 3, the double vertical array wave field reproduction system includes a first speaker 311 and a second speaker 312 as loud speaker arrays disposed in the same position. The first speaker 311 and the second speaker 312 may output WFS signals based on a distance 300 between a sound source and a user in each of speakers included in the loud speaker array, so that the user may perceive a position of the sound source.

However, when the double vertical array wave field reproduction system is seen from a side as shown by a diagram 320 of FIG. 3, the first speaker 311 is disposed at a higher position whereas the second speaker 312 is disposed at a lower position with respect to an ear height of the user.

Here, since the WFS signals output from the first speaker 311 and the second speaker 312 have a sound pressure in the form of a spherical wave, a wave field may be reproduced for the user even though the WFS signals are output at different heights from the height of the user.

However, due to a difference in the heights of the first speaker 311 and the second speaker 312 and the ear height of the user, a distance 321 from the first speaker 311 and the second speaker 312 to the user becomes greater than a distance 323 from an installation location 322 of the first speaker 311 and the second speaker 312 to the user. Accordingly, amplitude of a WFS signal listened to by the user who listened to the WFS signals output from the first speaker 311 and the second speaker 312 is reduced by as much as a difference between the distance 321 and the distance 323. As a result, the user may perceive the sound source to be located farther than the distance 300.

Thus, the wave field reproduction system according to the embodiment of the present invention may calculate an actual distance between the speaker and the user and an actual distance between the sound source and the speaker using the height of the speaker, and generate the WFS signals according to the actual distances. Therefore, the user may be prevented from perceiving a distance to the sound source differently according to the height of the speaker.

Figure 4:
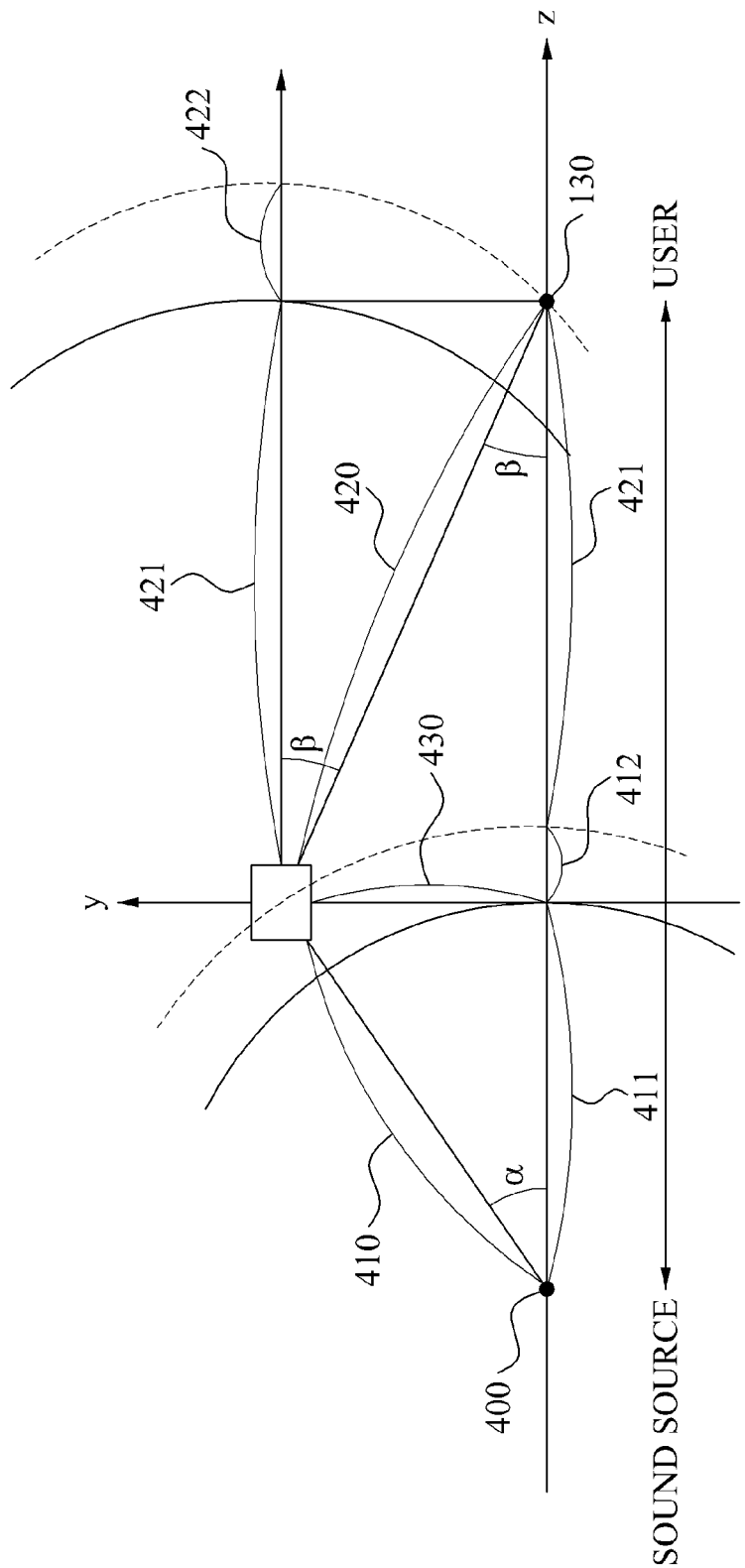
FIG. 4 is a diagram illustrating a process of determining a waveform distance by a waveform propagation distance determination unit according to an embodiment of the present invention.

FIG. 4 is a diagram illustrating a process of determining a waveform distance by a waveform propagation distance determination unit according to an embodiment of the present invention.

A propagation distance of a waveform, which refers to an actual propagation distance of a waveform propagate from a sound source, is a sum of a distance r 410 for the waveform to move from a position 400 of the sound source to a speaker and a distance l 420 for a waveform reproduced according to the WFS signals by the speaker to move to the user.

Here, the propagation distance of the waveform on a Z-axis which is a horizontal plane may be calculated using stationary phase approximation, as a sum of a distance R 411 from the position 400 of the sound source to the speaker and a distance L 421 from an installation location of the speaker to the user. Here, the distance R 411 may be $r*\cos(\alpha)$ and the distance L 421 may be $l*\cos(\beta)$.

Also, the propagation distance of the waveform on the Z-axis may be equal to the distance between the sound source and the user.

That is, the distance r 410 for the waveform to move from the position 400 of the sound source to the speaker may be larger than the distance R 411 between the sound source and the speaker out of the distance from the sound source to the user by as much as a distance $r-r*\cos(\alpha)$ 412. In addition, the distance l 420 for the waveform to move from the speaker to the user may be larger than the distance L 421 between the speaker and the user out of the distance from the sound source to the user by as much as a distance $l-l*\cos(\beta)$ 422.

The waveform propagation distance determination unit 220 may determine the waveform propagation distance r+l using Equation 1 calculating a sum of $\{r*\cos(\alpha)+l*\cos(\beta)\}$ which denotes the distance between the sound source and the user and $\{(r-r*\cos(\alpha))+(l-l*\cos(\beta))\}$ which denotes an additional propagation distance of the waveform according to the height of the speaker.

$$r+l=\{r*\cos(\alpha)+l*\cos(\beta)\}+\{(r-r*\cos(\alpha))+(l-l*\cos(\beta))\}$$ [Equation 1]

Here, the distance r 410 may be calculated using the distance R 411 between the sound source and the speaker and a height h 430 of the speaker. The distance l 420 may be calculated using the distance L 412 between the speaker and the user and the height h 430 of the speaker.

In addition, the WFS signal generation unit 230 may calculate the waveform propagation distance r+l instead of the distance between the user and a set position of the sound source, in an equation of a WFS driving function to generate WFS signals. Therefore, in a wave field reproduction system that reproduces a wave field with a plurality of speakers disposed at different heights, the user may perceive the sound source to be located in the set position.

Figure 5:
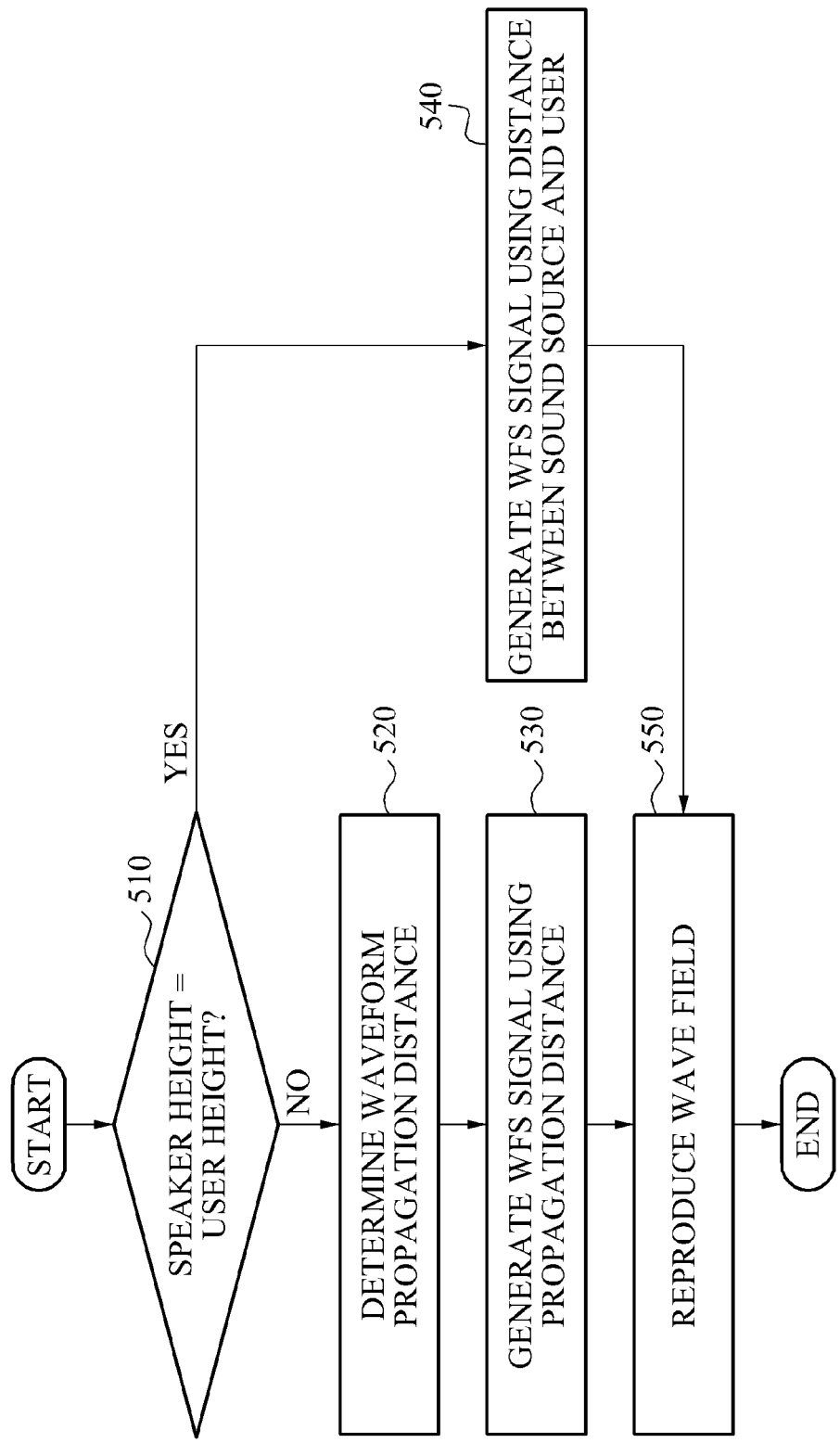
FIG. 5 is a flowchart illustrating a WFS signal generation method according to an embodiment of the present invention.

FIG. 5 is a flowchart illustrating a WFS signal generation method according to an embodiment of the present invention.

In operation 510, a speaker recognition unit 210 may determine whether heights of speakers included in a wave field reproduction system are equal to a height of a user.

Here, the speaker recognition unit 210 may use an ear height of the user as the height the user.

In operation 520, the waveform propagation distance determination unit 220 may determine a propagation distance of a waveform propagate from a sound source, using a height of a speaker determined to be different from the ear height of the user among the speakers included in the wave field reproduction system in operation 510. In further detail, the waveform propagation distance determination unit 220 may determine the distance for the waveform propagate from the sound source to pass through the speaker recognized by the speaker recognition unit 210 and move to the user, using the height of the speaker recognized by the speaker recognition unit 210.

In operation 530, the WFS signal generation unit 230 may generate a WFS signal corresponding to the speaker determined to be at a different height from the ear height of the user in operation 510, using the propagation distance of the waveform determined in operation 520.

In operation 540, the WFS signal generation unit 230 may generate a WFS signal corresponding to a speaker determined to be at the same height as the ear height of the user in operation 510, using a distance between the sound source and the user.

In operation 550, the speakers include in the wave field waveform reproduction system may reproduce a wave field for the user by outputting the WFS signal generated in operation 530 or operation 540.

According to embodiments of the present invention, a propagation distance of a waveform is determined according to a height of a speaker, and a WFS signal is generated using the propagation distance of the waveform. Therefore, when a plurality of speakers are disposed at different heights, the user may be prevented from considering a wrong position as a position of a sound source.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A wave field synthesis (WFS) signal generation apparatus comprising:
   a waveform propagation distance determination unit to determine a propagation distance of a waveform propagated from a sound source based on a height of a speaker,
   wherein the height of the speaker is at a different height from a height of a user, and
   wherein the waveform propagation distance determination unit also uses a distance between the sound source and the speaker with respect to a horizontal plane and a distance between the speaker and the user with respect to the horizontal plane to determine the propagation distance of the waveform;
   a WFS signal generation unit to generate a WFS signal corresponding to the speaker using the propagation distance of the waveform, and,
   a speaker recognition unit to recognize the speaker disposed at the different height from the height of the user among speakers included in a wave field reproduction system,
   wherein a speaker disposed at the same height of the user is not recognized by the speaker recognition unit.

2. The WFS signal generation apparatus of claim 1, wherein the waveform propagation distance determination unit determines a distance for the waveform propagated from the sound source based on a height of the recognized speaker to pass through the recognized speaker and move to the user.

3. The WFS signal generation apparatus of claim 1, wherein the waveform propagation distance determination unit determines the propagation distance of the waveform using the distance between the sound source and the speaker with respect to the horizontal plane, the distance between the speaker and the user with respect to the horizontal plane, and the height of the speaker.

4. The WFS signal generation apparatus of claim 1, wherein the WFS signal generation unit generates the WFS signal by setting the distance between the sound source and a user as the propagation distance of the waveform.

5. The WFS signal generation apparatus of claim 1, wherein the WFS signal generation unit generates the WFS signal corresponding to a same height speaker disposed at the same height as an ear height of the user, by setting a sum of the distance between the sound source and the same height speaker with respect to the horizontal plane and the distance between the same height speaker and the user with respect to the horizontal plane as the distance between the sound source and the user.

6. A wave field synthesis (WFS) signal generation method comprising:
  determining a propagation distance of a waveform propagated from a sound source based on a height of a speaker,
  wherein the height of the speaker is at a different height from a height of a user and
  wherein a distance between the sound source and the speaker with respect to a horizontal plane and a distance between the speaker and the user with respect to the horizontal plane is also used to determine the propagation distance of the waveform;
  generating a WFS signal corresponding to the speaker using the propagation distance of the waveform, and
  recognizing a speaker disposed at the different height from the height of the user among speakers included in a wave field reproduction system,
  wherein a speaker disposed at the same height of the user is not recognized by the speaker recognition unit.

7. The WFS signal generation method of claim 6, wherein the determining of the propagation distance comprises:
  determining a distance for the waveform propagated from the sound source based on a height of the recognized speaker to pass through the recognized speaker and move to the user.

8. The WFS signal generation method of claim 6, wherein the determining of the distance comprises:
  determining the distance of the waveform using the distance between the sound source and the speaker with respect to the horizontal plane, the distance between the speaker and the user with respect to the horizontal plane, and the height of the speaker.

9. The WFS signal generation method of claim 6, wherein the generating of the WFS signal comprises:
  generating the WFS signal by setting the distance between the sound source and a user as the propagation distance of the waveform.

10. The WFS signal generation method of claim 6, wherein the generating of the WFS signal comprises:
  generating the WFS signal by setting a sum of the distance between the sound source and the speaker with respect to the horizontal plane and the distance between the speaker and the user with respect to the horizontal plane as the distance between the sound source and the user.

* * * * *